United States Patent
Shim

(10) Patent No.: US 6,228,266 B1
(45) Date of Patent: May 8, 2001

(54) WATER TREATMENT APPARATUS USING PLASMA REACTOR AND METHOD THEREOF

(75) Inventor: Soon Yong Shim, Seoul (KR)

(73) Assignee: LG Industrial Systems Co., Ltd., Seoul (KR)

(*) Notice: Subject to any disclaimer, the term of this patent is extended or adjusted under 35 U.S.C. 154(b) by 0 days.

(21) Appl. No.: 09/112,320

(22) Filed: Jul. 9, 1998

(30) Foreign Application Priority Data

Jul. 10, 1997 (KR) .................................. 97 32005

(51) Int. Cl.⁷ .............................. C02F 3/00; C02F 1/48; C02F 9/00; C02F 1/461
(52) U.S. Cl. ..................... 210/614; 210/617; 210/621; 210/739; 210/195.1; 210/243; 210/748; 205/753
(58) Field of Search .................... 210/748, 614, 210/617, 621, 739, 195.1, 243; 205/753

(56) References Cited

U.S. PATENT DOCUMENTS

| | | | |
|---|---|---|---|
| 481,979 | * 9/1892 | Stanley . | |
| 501,732 | * 7/1893 | Roeske | 210/748 |
| 3,798,784 | * 3/1974 | Kovats et al. | 210/748 |
| 4,265,747 | * 5/1981 | Copa et al. . | |
| 4,624,765 | * 11/1986 | Cerkanowicz et al. | 210/748 |
| 5,019,268 | * 5/1991 | Rogalla | 210/617 |
| 5,048,404 | * 9/1991 | Bushnell . | |
| 5,326,530 | * 7/1994 | Bridges . | |
| 5,348,629 | * 9/1994 | Khudenko | 204/130 |
| 5,368,724 | * 11/1994 | Ayers et al. | 210/110 |
| 5,655,210 | * 8/1997 | Gregoire . | |
| 5,746,984 | * 5/1998 | Hoard . | |
| 5,879,555 | * 3/1999 | Khudenko | 210/615 |
| 5,893,979 | * 4/1999 | Held | 210/748 |
| 6,007,681 | * 12/1999 | Kawamura et al. . | |

* cited by examiner

*Primary Examiner*—Chester T. Barry

(57) ABSTRACT

A water treatment apparatus using a plasma reactor and a method of water treatment are disclosed. The apparatus includes a housing having a polluted water inlet and a polluted water outlet; a plurality of beads filled into the interior of the housing; a pair of electrodes, one of the electrodes contacting with the bottom of the housing, another of the electrodes contacting an upper portion of the uppermost beads; and a pulse generator connected with the electrodes by a power cable for generating pulses.

19 Claims, 6 Drawing Sheets

WATER TREATMENT APPARATUS USING PLASMA REACTOR AND METHOD THEREOF

BACKGROUND OF THE INVENTION

1. Field of the Invention

The present invention relates to a water treatment apparatus using a plasma reactor, and in particular to an improved water treatment apparatus using a plasma reactor which are capable of efficiently removing non-biodegradable pollutants contained in polluted water using a plasma formed by applying a high voltage of 30KV~150KV to a plasma reactor. The present invention also relates to water treatment methods.

2. Description of the Conventional Art

Recently, much attention has been paid to preventing fresh air and clean water from being polluted.

Environmental pollution prevention techniques are generally classified into an air pollution prevention technical field, a water pollution prevention technical field, an industrial waste disposal technical field, and a pollution-free technical field. Among the above-described technical fields, the water pollution prevention technical field will be explained.

In the water pollution prevention technical field, much study has been performed in order to provide a waste water treatment system.

However, no efficient and economical technique has been disclosed for supplying clean water. Namely, so far in the industry for treating polluted water, an organic material (such as a carbon hydrogen) contained in the polluted water is simply treated to be removed from the polluted water so that the BOD (Biochemical Oxygen Demand) is lowered thereby, completing a water treatment process. Then the water having lowered BOD is flown to river, lake or the like.

Namely, with industrial advancement and as people are rushed into cities, a various kinds of polluted materials which were not generated in the past are increasingly generated. So far, the thusly generated polluted materials have been treated without accurately analyzing any toxic components contained in the polluted materials and any effects thereof to the environment.

For example, chlorine which is generally used for disinfecting bacteria contained in water is known to form THM (Tri-Hallo-Methane) which may cause cancer.

In addition, polluted water containing much nitrogen and phosphorus is increasingly generated from homes and transferred into rivers, lakes, or the like, for thereby increasing BOD therein.

As shown in FIG. 1, in the conventional water treatment method, polluted water passes through a first stabilization tank and then flows to a concentrator.

The polluted water transferred from the concentrator is separated into a solid sludge and polluted water.

The solid sludge contained in the polluted water is transferred to a post incinerating apparatus through a drying apparatus and an incinerator.

The polluted water is transferred into an air stripper and passes through a second stabilization. The sludge gathered on the bottom of the second stabilization tank is transferred to the sludge gathering apparatus.

The sludge gathered by the sludge gathering apparatus is transferred to the drying apparatus.

In addition, the polluted water passed through the second stabilization tank is transferred to an aeration tank for separating the polluted water into a sludge and a polluted water, and then the polluted water is transferred to an RTO (Regenerative Thermal Oxidizer).

At this time, a part of the sludge transferred into the active sludge reactor is transferred into the sludge gathering apparatus, and another part of the same is transferred into a regenerative thermal oxidizer together with the polluted water passed through the aeration tank, and another part of the same is released to the outside as waste water.

However, the above-described polluted water treatment apparatus is unable to effectively remove nitrogen, phosphorus, or toxic materials contained in the polluted water.

In particular, the polluted materials generated from factories and containing a choline component, namely, PCE (perchloroethylene), PCB (polychlorinated biphenyl), and DCP (dichlorophenol) may contain a very toxic material. Furthermore, the above-described polluted material generates a secondary toxic material upon reaction with a choline component contained therein. Therefore, when the polluted water containing the above-described polluted material is released into a river or lake, the river or lake is seriously damaged compared to other polluted water which does not contain the above-described polluted materials.

In addition, the chlorine-contained polluted material is not easily dissolved under the natural environment nor naturally dissolved into water. There is not a proper method for economically eliminating the above-described pollutants.

For example, in the case of the dyeing component polluted water, dyeing component polluted water contains choline components as well as nitric acid components, so that it is very harmful and has a very high toxicity. The above-described pollutants are controlled as one of the most toxic materials in most countries.

For reference, dyeina factories represent about 6% of the factories which generate pollutants and about 3.5% of the total amount of pollutants. At a glance, such figures seem to cause less pollution problems compared to other pollutants but the pollution degree (treatment-before BOD) is about 24% of the total degree. Therefore, the dyeing component polluted water causes a large pollution problem.

For effectively treating the above-described polluted water, there are known a physical and chemical treating method, a biochemical treating method, a coagulation and sediment method, the Fenton oxidizing method, an electron beam processing method, an activated charcoal adsorption method, a film separation method, and a plasma processing method.

Among the above-described methods, the physical and chemical processing method is directed to preprocessing the pollutant before polluted water is treated. Therefore, the physical and chemical processing method is incapable of actually eliminating pollutants.

In addition, as the biochemical processing method, an activated sludge process is widely used in industry for adsorbing and dissolving organic materials using activated aerobic bacteria. In this method, a lot of sludge is generated, and in particular the dyeing material contained in the dyeing component polluted water is not degraded. Even when it is degraded, it may generate a secondary toxic material, so that the pollutant treating efficiency is very low. In order to overcome the above-described problems, a method which uses an anaerobic bacteria among the biochemical processing method is disclosed. However, this method has a problem in that it takes a long time (tens of days) for processing the non-biodegradable pollutants.

The coagulation and sediment method is capable of eliminating a wide range of pollutants but is incapable of eliminating a dissolvable material such as a soluble component.

The Fenton oxidizing method (disclosed by Fenton of England at the end in the 19th century) is the method for processing polluted water using a phenomenon that strong oxidization occurs when $H_2O_2$ and Fe ions react. This method has a disadvantage in that the agent provided for strong oxidization is very expensive.

The ozone processing method is implemented using ozone having a strong oxidizing force. This method is good for dissolving a non-soluble material, deodorizing a predetermined smell, and eliminating coloring components. However, the ozone generator is expensive, and the ozone occurrence efficiency is no more than 5%, so that power consumption is increased.

The electron beam method has an advantage in that it is possible to overcome the problems encountered in the above-described methods. However, a system for generating electron beams and implementing acceleration for the beams is complicated and expensive, so that the operation cost of the system is increased like the ozone processing method. In addition, the depth of water into which electron beams pass through is a few mm, the polluted water should be rapidly flowed over a region which is wide and shallow for thereby implementing a water treatment process. In addition, the electron beam generator is bulky and is designed to generate a high capacity, thereby increasing fabrication cost. Furthermore, the electron beam generator may generate harmful X-rays.

The activated charcoal adsorption method is directed to adsorbing pollutants using an activated charcoal having a plurality of fine holes. In this case, the activated charcoal is recyclable. However, the processing efficiency of the pollutants is decreased, so that it is not used solely.

The film separation method has an advantage in that a film material is separable based on its particle size and chemical affinity by a physical and chemical function of the film material. However, the fabrication cost is increased, and the preprocessing procedure is complicated. In particular, if the preprocessing procedure is not properly performed, the expensive facility may be damaged.

In the method for generating an activated radical based on a plasma for thereby implementing a water treatment, there are the following problems: First, a relatively high electric field (over $2\times10^5 \sim 3\times10^5$ Volt/cm) is needed for obtaining electrical insulation destruction under water. Second, since a streamer is quickly transferred by a discharging operation under water, the streamer corona is not continuously implemented, so that an arc or spark easily occurs. Third, even though the streamer corona occurs continuously, since the reactive region of the activated radical generated by the streamer is narrow, it is impossible to effectively eliminate the pollutants. The above-described problem may be overcome by the electron beam method which uses MeV (Mega electron Volts). However, the electron beam method is implemented by a relatively bulky system, and the human body may be hurt.

SUMMARY OF THE INVENTION

Accordingly, it is an object of the present invention to provide a water treatment apparatus using a plasma reactor and a method of treating water which overcome the aforementioned problems encountered in the conventional art.

It is another object of the present invention to provide a water treatment apparatus using a plasma reactor and a method of treating water which are capable of generating a plasma using a high voltage of 30KV~150KV by which harmful X-rays are not generated for thereby effectively treating pollutants.

It is another object of the present invention to provide a water treatment apparatus using a plasma reactor and a method of treating water which are capable of implementing a polluted water treatment apparatus using a relatively low expense and of minimizing the operation and maintenance cost.

To achieve the above objects, there is provided a water treatment apparatus using a plasma reactor according to a first embodiment of the present invention which includes a housing having a polluted water inlet and a polluted water outlet; a plurality of beads filled in the interior of the housing; a pair of electrodes, one of the electrodes contacting with the bottom of the housing, another of the electrodes containing with an upper portion of the uppermost beads; and a pulse generator connected with the electrodes by a power cable for generating pulses.

To achieve the above objects, there is provided a water treatment apparatus using a plasma reactor according to a second embodiment of the present invention which includes a polluted water gathering tank for gathering and storing a polluted water introduced thereinto; a plurality of plasma reactors connected with the polluted water gathering tank by a first connection tube for processing the pollutants contained in the polluted water using a plasma; a pulse generator for generating pulses so that a plasma is generated by the plasma reactor; a storing tank for storing the polluted water processed by the plasma reactor and introduced thereinto through a second connection tube; and a return tube connected between the polluted water gathering tank and the storing tank.

To achieve the above objects, there is provided a water treatment method using a plasma reactor which includes the steps of storing polluted water containing pollutants into a polluted water gathering tank; processing the pollutants contained in the polluted water by flowing the polluted water to one or a plurality of plasma reactors; and gathering the first processed polluted water into a storing tank and discharging the same to the outside.

Additional advantages, objects and features of the invention will become more apparent from the description which follows.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The water treatment apparatus using a plasma reactor and a method thereof according to the present invention will be explained with reference to the accompanying drawings.

Figure 1:
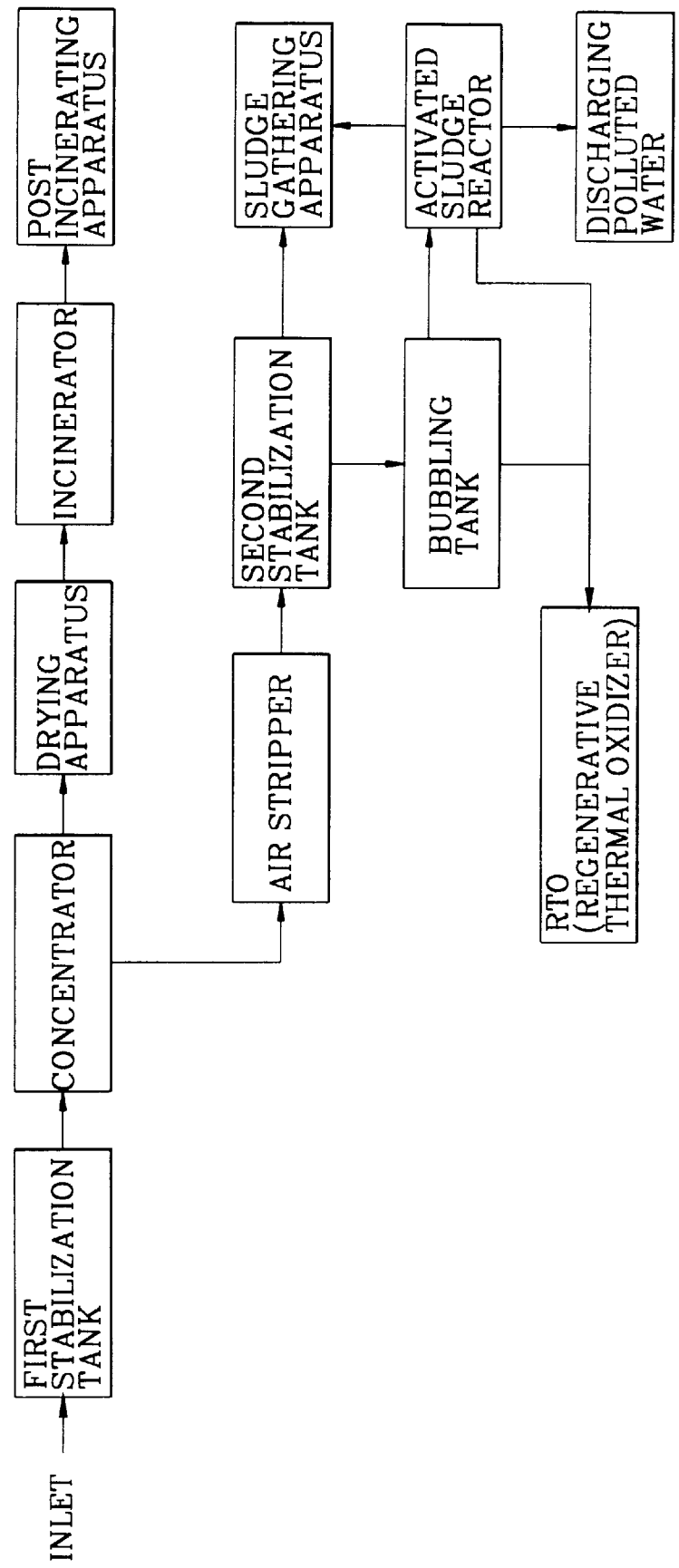
FIG. 1 is a block diagram illustrating a conventional water treatment method.
Figure 2:
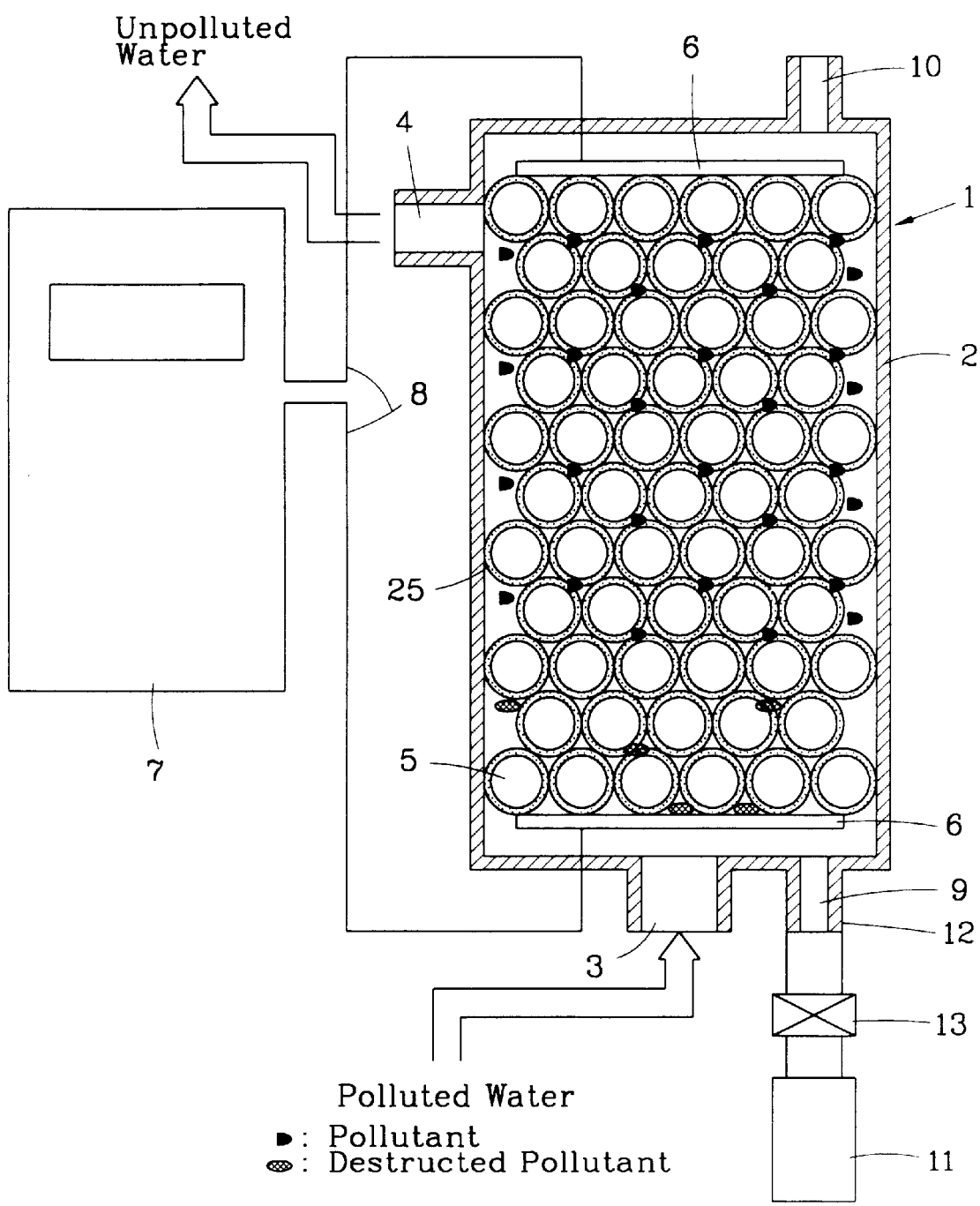
FIG. 2 is a vertical cross-sectional view illustrating a plasma reactor according to the present invention.

As shown in FIG. 2, in a plasma reactor 1, a polluted water inlet 3 is formed at a lower portion of a housing 2, a polluted water outlet 4 is formed at an upper portion of the housing 2. A plurality of beads 5 are filled in the interior of the housing 2.

At this time, the size and number of the beads 5 filled into the interior of the housing 2 are determined by the density and processing amount of the pollutants.

For example, if the density of the pollutants contained in the polluted water is high, or if the processing amount of the same is large, beads 5 of small diameter are filled into the interior of the housing 2. On the contrary, if the density of the pollutants contained in the polluted water is low, or the processing amount of the pollutants is small, beads 5 of large diameter are filled into the interior of the housing 2. The size of the beads filled into the interior of the housing 2 is in a range from a few mm to tens of mm based on the application of the same. In addition, the number of beads is determined by the application thereof.

At this time, the beads 5 filled into the interior of the housing 2 are made of acryl, a ferro dielectric such as $BaTiO_3$, a hollow metallic member, a polyethylene, nylon, a glass without Pb, a ceramic of the alumina group, a photocatalyst such as $TiO_2$, a polyethylene coated with nickel, etc. and the beads 5 are of a hollow ball shape, a cylindrical shape, etc.

In addition, the lower surface of the lowermost beads 5 filled into the housing 2 and the upper surface of the uppermost beads 5 contact with predetermined shaped electrodes 6, respectively, and a pulse generator 7 is installed in the housing 2 for generating pulses a few of micro or nano second units using a high voltage of 30KV~150KV and transmitting the thusly generated pulses to the electrodes 6.

The pulse generator 7 and the electrodes 6 are connected by a power cable 8.

Here, the electrodes 6 are of a wire-plate type, a wire-wire type, or a cylinder-wire type.

In one embodiment, one electrode is formed of a wire, and the other electrode is formed of a plate. In another embodiment, both electrodes are formed of a wire. In yet another embodiment, one electrode may be formed of a cylinder, and the other electrode may be formed of a wire.

The electrode 6 made of a wire is formed in order for the electrode 6 not to face the flowing of the polluted water with its flat surface so that the unpolluted water is not blocked by the electrode 6 when it passes through the interior of the housing 2.

In addition, an air inlet hole 9 is formed on the lower surface of the housing 2, and an air outlet hole 10 is formed on the upper surface of the same. The air inlet hole 9 is connected with a compressed air generation member such as an air compressor 11, so that air bubbles are flown into the interior of the housing 2 during the processing operation of the polluted water for the purpose that the air bubbles flow between the beads 5 for thereby generating smaller air bubbles, whereby the pollutants contained in the unpolluted water are separated, and oxygen is effectively supplied thereinto so that ozone is more easily generated by the plasma. In addition, the plasma is effectively transferred between the beads when applying voltage to the electrode.

A regulator 13 is installed in an air supply tube 12 connecting the air compressor 11 and the housing 2 for controlling the amount of compressed air supplied into the interior of the housing 2.

The polluted water treatment apparatus using a plasma reactor according to the present invention will be explained.

Figure 3A:
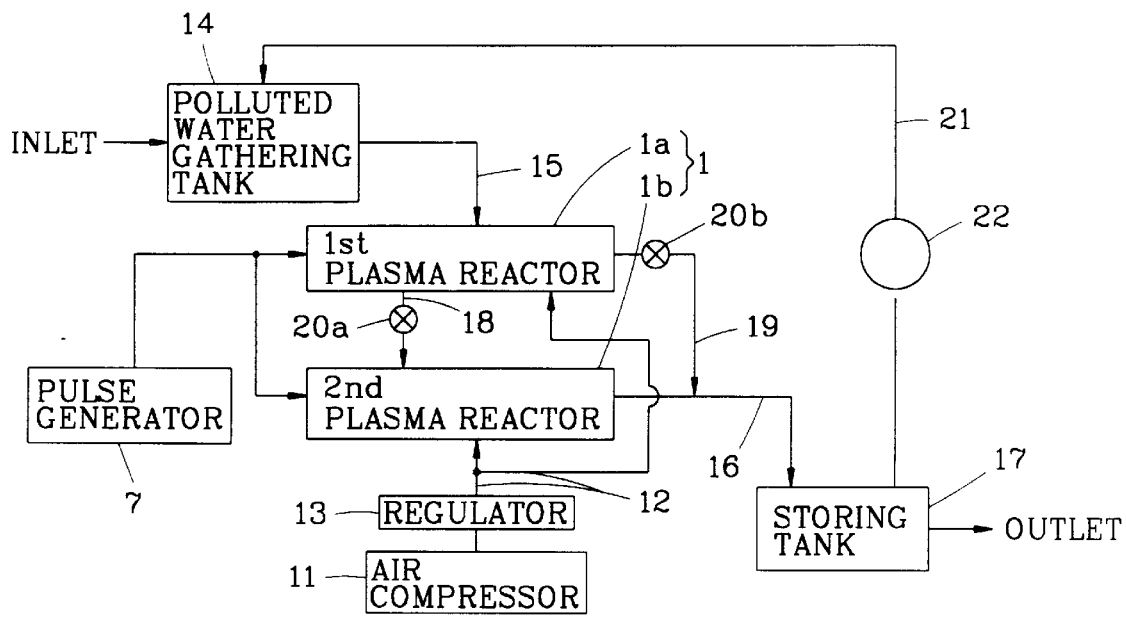
FIG. 3A is a schematic view illustrating a water treatment apparatus using a plasma reactor according to a first embodiment of the present invention.

As shown in FIGS. 2 and 3A, the polluted water treatment apparatus using a plasma reactor according to the present invention includes a polluted water gathering tank 14 for gathering polluted water, more than one plasma reactor 1 for treating pollutants contained in the polluted water formed in the shape of a water film on the outer circumferential surface of each of the beads 5 using the plasma when the polluted water is flown into the housing 2 through a first connection tube connected with the polluted gathering tank 14, a pulse generator 7 for supplying pulses so that the plasma is generated in the interior of the plasma reactor 1, a storing tank 17 for storing the polluted water when the polluted water which is first treated by the plasma reactor 1 is flown thereinto through the second connection tube 16, a pollution measuring apparatus for measuring the pollution degree of the polluted water stored in the storing tank 17, and a return tube 21 for transferring the polluted water stored in the storing tank 17 to the polluted water gathering tank 14.

A pump 22 is installed at a predetermined portion of the return tube 21 connecting the polluted water gathering tank 14 and the storing tank 17 for generating a predetermined pumping force so that a part of the polluted water which is first treated and stored in the storing tank 17 is caused to flow again into the polluted water gathering tank 14. The pollution degree of the polluted water which is first treated by the plasma reactor 1 is measured by the pollution degree measuring apparatus in the storing tank 17. As a result of the measurement, if the pollution degree exceeds a predetermined degree, the polluted water is retreated by the plasma reactor 1 by flowing the polluted water to the polluted water gathering tank 14.

In addition, in the present invention, a plurality of plasma reactors may be installed for effectively treating the pollutants contained in the polluted water by using a plasma. In this case, the plurality of the plasma reactors are preferably connected in series or in parallel or in a combination of series and parallel connections.

As shown in FIG. 3A, first and second plasma reactors 1a and 1b are connected in series by a third connection tube 18. The second connection tube 16 connecting the second plasma reactor 1b and the storing tank 17 is connected with a bypass tube 19 connected to the first plasma reactor 1a. At this time, valves 20a and 20b are installed in the third connection tube 18 and the bypass tube 19, respectively.

Therefore, when the pollutants are treated using the first plasma reactor 1a and discharged to the storing tank 17, the valve 20a installed in the third connection tube 18 is closed, and the valve 20b installed in the bypass tube 19 is opened. When treating pollutants using two plasma reactors 1, the valve 20a installed in the third connection tube 18 is opened, and the valve 20b installed in the bypass tube 19 is closed.

Figure 3B:
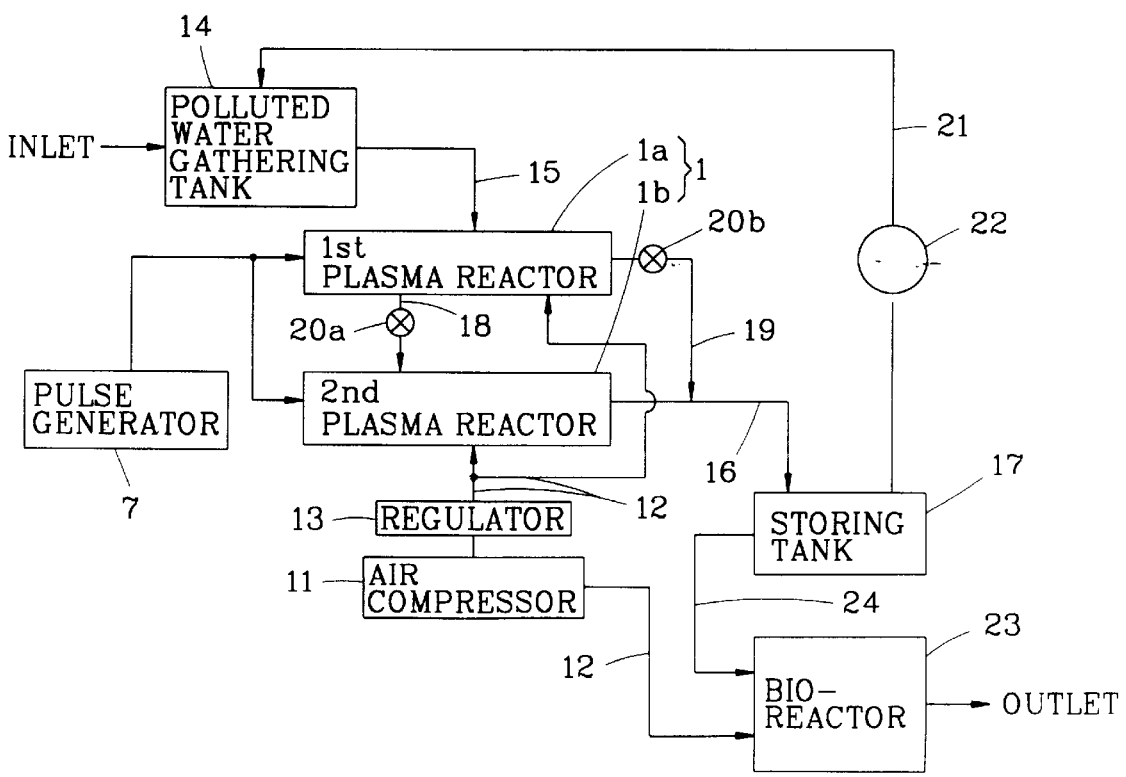
FIG. 3B is a schematic view illustrating a water treatment apparatus using a plasma reactor and a bio-reactor according to a second embodiment of the present invention.

In addition, as shown in FIG. 3B, in the second embodiment of the present invention, a bio-reactor 23 is connected with the storing tank 17 by a fourth connection tube 24 to decrease the operational cost and for selectively treating the pollutants based on the type of the pollutants contained in polluted water.

The bio-reactor 23 is of a fluidized bed type or a fixed bed type. In this structure, bacteria remains in a floated state in the bio-reactor 23 or may be attached to the inner surface of the same, based on the type of pollutants to be treated. A bubbling means is installed in the bio-reactor 23 for increasing the treating efficiency of the pollutants.

Generally, as a bubbling means, an air compressor may be used for generating a compressed air, or an impeller may be used for generating a predetermined water flow.

In another embodiment of the present invention, the air compressor 11 generating compressed air into the interior of the plasma reactor 1 is connected with the bio-reactor 23 by an air supply tube 12 thereby also forming a bubbling means.

Figure 4:
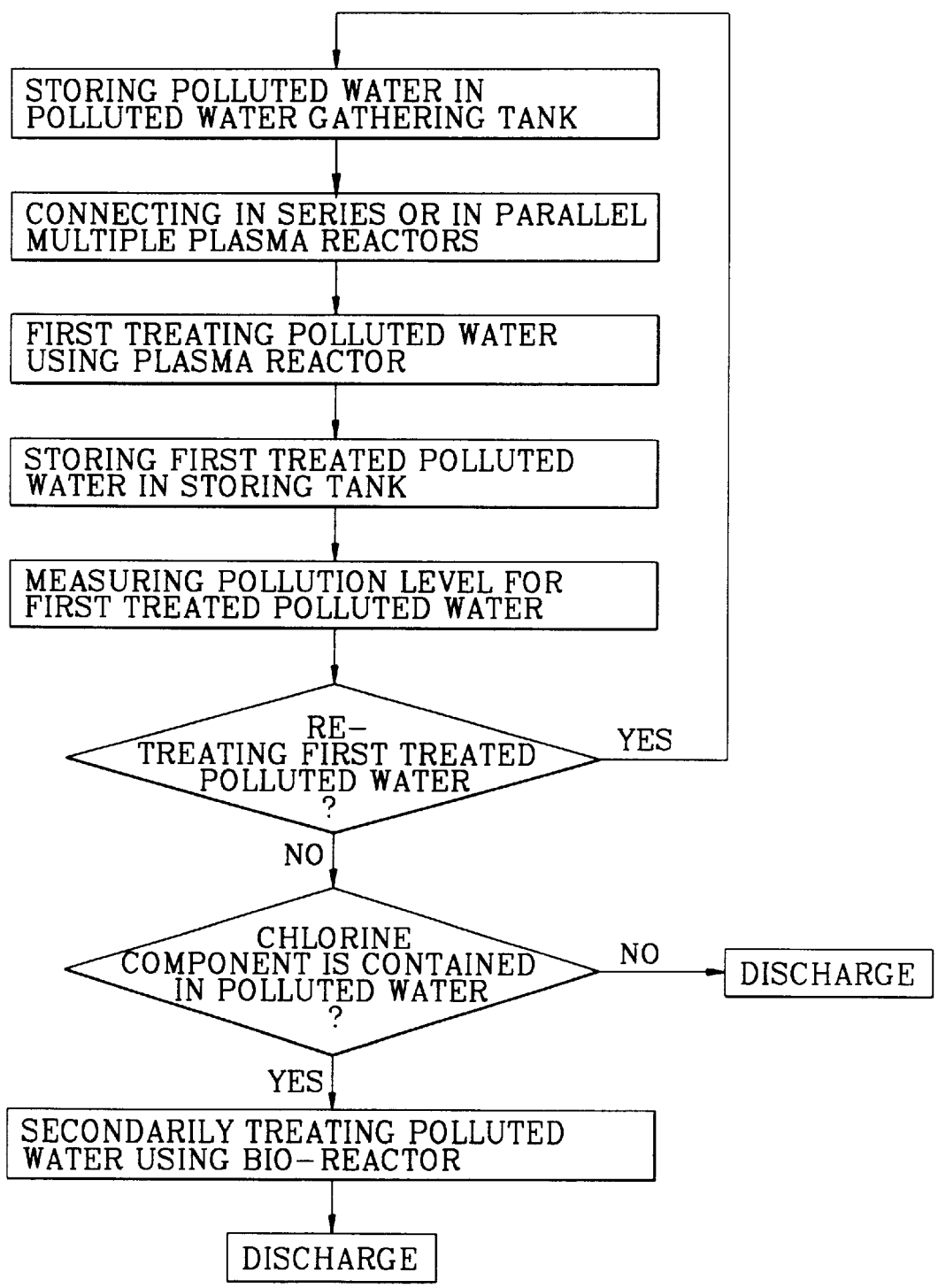
FIG. 4 is a block diagram illustrating a water treatment method according to the present invention.

FIG. 4 is a block diagram illustrating the procedure for treating the polluted water using a plasma reactor according to the present invention.

The polluted water treatment method according to the present invention is classified into a first process which is implemented by the plasma reactor 1 and a second process which is implemented by the bio-reactor 23.

Therefore, in the present invention, the reactors 1 and 23 may be independently operated. The processing procedure for the polluted water will be explained in detail.

First, it is determined that whether the plasma reactors 1 for implementing the first treating process are connected in series or in parallel, and it is determined whether the bio-reactor 23 is used for implementing the second treating process.

If the polluted water to be processed is of a high density, a plurality of plasma reactors 1 are connected in series, for thereby maximizing the polluted water processing time, and, if the polluted water is of a relatively low density, the plasma reactors 1 are connected in parallel, for thereby increasing the processing capacity of polluted water per hour.

In order to effectively eliminate non-soluble materials such as PCBs, PCE, DCP, etc. in which a chlorine component is contained, the pollutants, namely, the non-dissolvable material which is formed when one chlorine group is detached by the plasma in the plasma reactor 1, are dissolved by bacteria, and the bio reactor 23 is further used.

The operation of the polluted water treatment apparatus using the plasma reactor according to the present invention will be explained with reference to the accompanying drawings.

In a state where the operational system of the facility is set according to the type and amount of the pollutant water, the polluted water generated due to industrial activity is gathered and is introduced into the polluted water gathering tank 14, and the thusly gathered polluted water is flowed into the plasma reactor 1 through the first connection tube 15.

When the pollutant water is flowed into the interior of the plasma reactor 1, as shown in FIG. 2, a water film 25 is formed on the outer circumferential surface of each of the beads 5 filled into the housing 2.

At this time, when the compressed air generated by the air compressor 11 is controlled by the regulator 13 and is introduced into the interior of the housing 2, a plurality of air bubbles pass through the spaces formed between the beads 5, and then the air bubbles are split for dividing the pollutants, so that oxygen easily becomes ozone by exposure to the plasma.

In this state, when a predetermined pulse is applied to the electrodes 6 contacting with the beads 5 in the uppermost portion of the housing 2 and the beads 5 in the lowermost portion of the housing 2, a plasma is generated in the housing 2, so that the polluted water which is formed on the outer circumferential surface of the beads 5 in a film state is treated by the plasma.

The characteristics of the pulse which is transferred from the pulse generator 7, for thereby generating plasma, affects the polluted water treatment capacity of the plasma reactor 1.

In the second embodiment of the present invention, the problems encountered in the conventional art are overcome by applying a high voltage of 30KV~150KV and the following principle without generating harmful X-ray.

Generally, water has a relatively high dielectric ($\epsilon=81$) compared to air ($\epsilon=1$). The dielectric of water is similar to the dielectric of a ceramic.

Therefore, in order to implement the plasma reactor 1 as shown in FIG. 2, when the water films 25 are formed on the outer circumferential surfaces of the beads 5 by flowing the polluted water from the polluted water gathering tank 14 into the housing 2 through the polluted water inlet 3, the pulses generated by the pulse generator 7 are supplied to the electrode 6, for thereby forming a plasma, so that the pollutants contained in the polluted water are destroyed.

Namely, the distance between the beads 5 is the same as the thickness of the water film 25. The thickness of the water film 25 is a few hundred of micrometers. It is possible to effectively destroy the pollutants contained in the polluted water using the plasma generated in the housing 2.

In more detail, a voltage of 20–150KV is applied to the water film having the above-described thickness, forming a relatively high electric magnetic field. Therefore, plasmas are formed between the beads 5 in a web shape. The activated radicals such as O, H, $O_3$, $H_2O_2$, UV, and $e^{-aq}$ are generated in the housing 2 by the generated plasmas. The thusly generated activated radicals are reacted with the pollutants contained in the polluted water.

In particular, since an oxygen atom has a very strong oxidization force compared to the oxygen molecule, it is possible to effectively oxidize almost all pollutants.

In addition, since it is possible to generate the activated radicals on the spot, the system is operated very economically.

The hydrogen (H) and OH group generated by the plasma generated in the housing 2 reduces the nitrogen (N) and phosphorus (P) contained in the polluted water, so that it is possible to easily remove the nitrogen (N) and phosphorus (P).

Even though the oxygen atom and UV are generated for generating ozone using the conventional ozone generator, in this case, the life span of the oxygen atom is a few seconds. Therefore, only the ozone having a life span of 10 through 15 minutes is used, and other activated radicals including the oxygen atom, are eliminated, so that it is not applicable for the pollutant water processing apparatus.

The pollutants contained in the polluted water are first eliminated by the plasma reactor 1. The thusly processed polluted water is flowed into the next storing tank 17. The concentration of the pollutants is measured. The polluted water is fully processed and is discharged into a river or stream.

However, if the result of the measurement, shows that the density of the pollutants contained in the polluted water in the storing tank 17 exceeds a predetermined level, the polluted water and is then first processed by the plasma reactor 1 is discharged to the outside. The thusly processed polluted water stored in the storing tank 17 is transferred to the polluted water gathering tank 14. Thereafter, the above-described processes are repeated until the pollutants are fully eliminated.

So far, the method steps where the polluted water containing organic materials which are not easily dissolved is flowed into the plasma reactor, for thereby effectively processing the polluted water, was explained. In this case, when processing the pollutants using only the plasma reactor, the consumption of electric power is increased, based on the plasma reactor, for thereby increasing the operational cost of the system.

Namely, in order to eliminate 100% of the pollutants contained in the polluted water using only plasma reactor, since a plurality of plasma reactors are connected in series, the consumption of electric power is increased.

Figure 5:
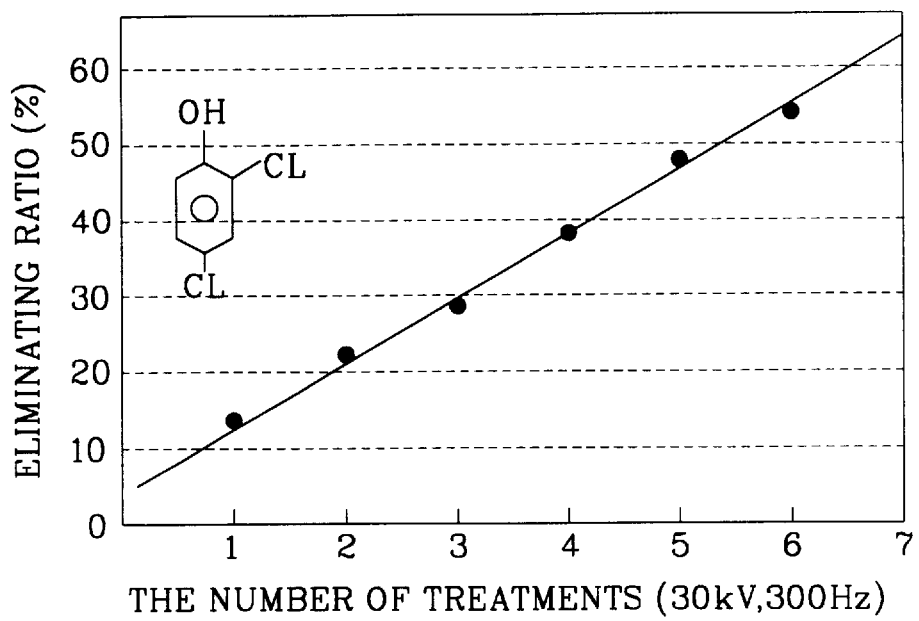
FIG. 5 is a graph illustrating an experimental result which is obtained using only a plasma reactor for a water treatment method by eliminating DCP according to the present invention.

FIG. 5 is a graph illustrating an experimental result which is obtained using only plasma reactors for the water treatment by eliminating DCP according to the present invention. As shown therein, in order to eliminate more than 60% of the pollutants contained in the polluted water, seven plasma reactors are connected in series or the plasma process is performed seven times using one plasma reactor, thereby eliminating 60% of the pollutants.

In the case that there are provided pollutants which are easily processed, since it is possible to eliminate 100% of the pollutants in a single process using only the plasma reactor, the number of the plasma reactors is determined based on the type of pollutants contained in polluted water.

Since the polluted water generated by a factory contains pollutants which are not easily processed, the process should be performed several times, for thereby increasing the operational cost of the system. Therefore, preferably, the plasma reactor and the bio-reactor are connected in series, thereby effectively processing the pollutants.

In the embodiment of FIG. 3B, since the bio reactor which is capable of decreasing the operation time and cost is used, it is possible to decrease the operation and maintenance costs.

For example, if the polluted water contains non-soluble components such as PCBs, PCE, DCP, etc. including chlorine components, since the above-described components are very stable, it is impossible to dissolve the above-described components using any type of bacteria. Therefore, it is necessary to separate one chlorine group using the plasma with respect to a material having a plurality of chlorine groups so that it is possible to easily process the pollutants using the bio-reactor 23.

Figure 6:
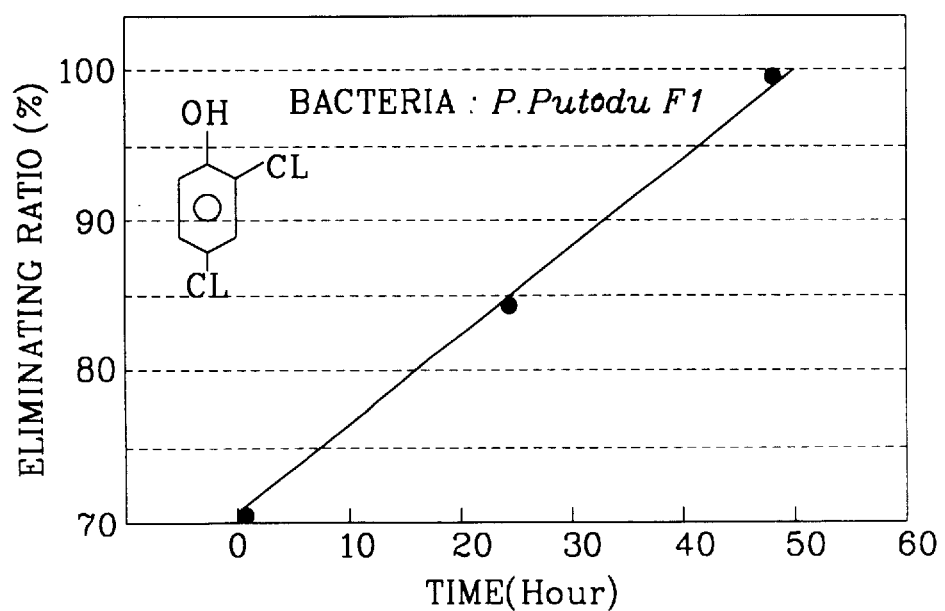
FIG. 6 is a graph illustrating a result which is obtained by processing the DCP with P. Putodu F1 Bacteria, in which DCP a chloro group is eliminated after eliminating one chloro group of the DCP in the plasma reactor during a water treatment.

FIG. 6 is a graph illustrating a result which is obtained by processing the DCP by P. Putodu F1 Bacteria, in which, in the DCP, a chloro group is eliminated after eliminating one chloro group of the DCP in the plasma reactor during a water treatment. As shown therein, one chlorine group is separated from the material having a plurality of chlorine groups of the non-soluble pollutants contained in the polluted water and then the pollutants are transferred to the bio-reactor 23, so that the bacteria in the bio-reactor 23 process 100% the non-soluble material for 48 hours, from which one chlorine group is separated.

Figure 7:
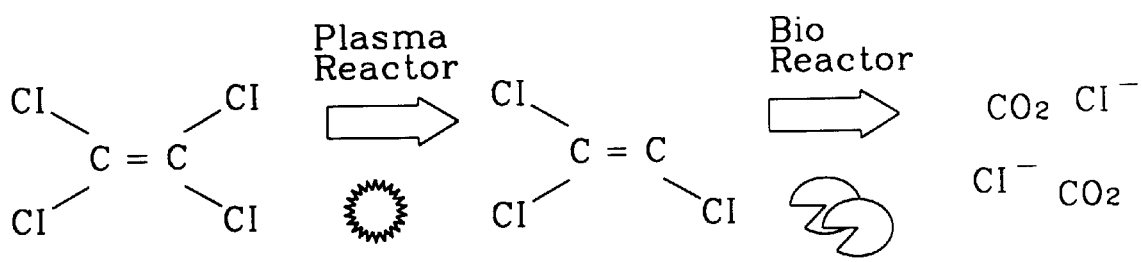
FIG. 7 is a view illustrating a polluted water processing method for a pollutant having chloro groups during a water treatment.

Therefore, the process is performed based on some of the following cases. The first case is that it is impossible to process when the plasma process is not performed. The second case is that the electric power consumption is increased when the process is performed by only the plasma. As shown in FIG. 7, the above-described two cases may be combined, thereby effectively processing the pollutants.

Namely, the above-described two problems that the electric power consumption is increased based on the operation of the plasma reactor and the non-dissolvable pollutants are not easily processed using the bio-reactor are easily overcome by concurrently using the plasma reactor and the bio-reactor.

In addition, in the present invention, the piped water may be processed by using the plasma reactor.

Namely, when pulses are supplied to the electrodes 6 in the housing 2, a web-like plasma having more than about 10 eV is generated. At this time, since the energy of 1 eV corresponds to the temperature of about 10,000° C., in theory, the plasma generated in the housing 2 has a temperature of more than about 100,000° C.

Since the mass of the electron is relatively too small, it is impossible to actually feel the above-described temperature. Water is partially heated by a stream passing through the water, and then the water is quickly and finely expanded, so that a shock wave is generated over the entire portion of the water molecule, whereby the shock wave destroys the bacteria contained in the polluted water.

In addition, the bacteria may be destroyed by ozone generated when forming plasma.

When processing the piped water, since a lot of water should be processed per hour, a plurality of plasma reactors are preferably connected in parallel.

Therefore, the present invention may be adapted for processing the piped water and fabricating a heavy water.

As described above, the pollutants contained in the polluted water are first processed by forming a plasma in the housing of the plasma reactor, and then are secondarily processed by the bio-reactor, so that the maintenance and operation costs are decreased.

In addition, it is easy to design the capacity of the system based on the pollution level of the pollutants and the processing amount, so that an effective pollutant processing is implemented.

Although the preferred embodiments of the present invention have been disclosed for illustrative purposes, those skilled in the art will appreciate that various modifications, additions and substitutions are possible, without departing from the scope and spirit of the invention, as recited in the accompanying claims.

What is claimed is:

1. A plasma reactor, comprising:
    a housing having a polluted water inlet, a polluted water outlet and an air inlet hole;
    a plurality of beads disposed in the interior of the housing, said beads being selected from the group consisting of a ferro dielectric material, a photocatalytic acryl material, a photocatalytic polyethylene material, a photocatalytic nylon material, and a photocatalytic glass material;
    a pair of electrodes, one of said electrodes contacting the bottom of the housing, another of said electrodes contacting an upper portion of the uppermost beads; and
    a pulse generator connected with the electrodes.

2. The reactor of claim 1, wherein said glass does not contain Pb.

3. The reactor of claim 1, wherein said shape of beads is a ball shape, a circular plate shape, or a cylindrical shape.

4. The reactor of claim 1, wherein one of said electrode is formed of a wire, and the other electrode is formed of a plate.

5. The reactor of claim 1, wherein said both electrodes are formed of a wire.

6. The reactor of claim 1, wherein one of said electrode is formed of a cylinder, and the other electrode is formed of a wire.

7. The reactor of claim 1, wherein said housing includes said air inlet hole formed in a lower portion therein and an air outlet hole formed in an upper portion therein, said air inlet hole being connected with a compressed air generating.

8. A water treatment apparatus, comprising:
   a polluted water gathering tank for gathering and storing a polluted water introduced thereinto;
   a plurality of plasma reactors connected with the polluted water gathering tank by first connection tube for processing the pollutants contained in the polluted water using a plasma wherein at least one of the plasma reactors comprises a housing with an interior and a plurality of beads filled in the interior of the housing;
   a pulse generator for generating pulses so that a plasma is generated by the plasma reactor;
   a storing tank for storing the polluted water processed by the plasma reactor and introduced thereinto through a second connection tube; and
   a return tube connected between the polluted water gathering tank and storing tank.

9. The reactor of claim 8, wherein said plurality of plasma reactors is connected in such a manner selected from the group comprising a serial connection, a parallel connection, and a combination of the serial and parallel connection.

10. The reactor of claim 8, wherein said storing tank is connected with a bio-reactor.

11. The reactor of claim 10, wherein said bio-reactor is connected with a bubbling means.

12. The reactor of claim 10, wherein said bio-reactor is a fluidized bed type or a fixed bed type.

13. A water treatment method, comprising the steps of:
    storing a polluted water containing pollutants into a polluted water gathering tank;
    processing the pollutants contained in the polluted water by flowing the polluted water one or a plurality of plasma reactors wherein at least one of the plasma reactors comprises a housing with an interior and a plurality of beads filled in the interior of housing and an air inlet hole formed in a lower portion of the housing; and
    gathering the first processed polluted water into a storing tank and discharging the same to the outside.

14. The method of claim 13, wherein said one or a plurality of plasma reactors are connected in series for thereby extending a high density polluted water processing time.

15. The method of claim 13, wherein said one or a plurality of plasma reactors are connected in parallel for thereby increasing a low density polluted water processing capacity per hour.

16. The method of claim 13, wherein in a state that the polluted water which is first processed by one or a plurality of plasma reactors is introduced into the storing tank, the processing density of the polluted water is measured, and as a result of the measurement, when the measured level exceeds a predetermined level, the polluted water is introduced again into the polluted water gathering tank for thereby reprocessing the first processed polluted water in the plasma reactor.

17. The method of claim 13, further comprising a step in which the polluted water processed by one or a plurality of plasma reactors and then stored in the storing tank is secondarily processed by a bio-reactor and then is discharged to the outside.

18. The method of claim 17, wherein said polluted water is bubbled when secondarily processing the polluted water using the bio-reactor.

19. The method of claim 13 wherein the beads are made of one selected from the group comprising a ferro dielectric, a photocatalytic, acryl, polyethylene, nylon and glass.

* * * * *